United States Patent [19]

Martin et al.

[11] Patent Number: 4,993,111
[45] Date of Patent: Feb. 19, 1991

[54] WING CUTTER ATTACHMENT

[75] Inventors: Eugene Martin, Ephrata; Scott Cook, Strasburg; Michael E. Lease, Kinzers, all of Pa.

[73] Assignee: Foodcraft Equipment Company, Inc., Lancaster, Pa.

[21] Appl. No.: 472,059

[22] Filed: Jan. 30, 1990

[51] Int. Cl.$^5$ ............................................. A27C 21/00
[52] U.S. Cl. ..................................... 452/169; 452/170
[58] Field of Search ........................................ 17/11, 52

[56] References Cited

U.S. PATENT DOCUMENTS

| | | | |
|---|---|---|---|
| 2,243,951 | 6/1941 | Gehlke | 17/45 |
| 3,639,945 | 2/1972 | Duncan et al. | 17/11 |
| 4,016,624 | 4/1977 | Martin et al. | 17/11 |
| 4,424,608 | 1/1984 | Martin | 17/11 |
| 4,503,587 | 3/1985 | Martin | 17/11 |
| 4,536,919 | 8/1985 | Cashwell et al. | 17/11 |
| 4,563,791 | 1/1986 | Martin et al. | 17/11 |
| 4,577,368 | 3/1986 | Hazenbroek | 17/52 |
| 4,597,136 | 7/1986 | Hazenbroek | 17/11 |
| 4,769,872 | 9/1988 | Hazenbroek et al. | 17/11 |
| 4,935,990 | 6/1990 | Linnenbank | 17/11 |

Primary Examiner—Willis Little

[57] ABSTRACT

An apparatus for cutting breast-attached wings into segments includes a conveyor chain for carrying the wings, attached to whole breasts, along respective gaps between panels on either side of the breasts and over a rotating knife for removing the wing tips, thence over a stationary knife for removing the flat segments, and finally past rotating knives for removing the drumettes from the breasts. Fully automatic and particularly accurate cuts are obtained.

3 Claims, 3 Drawing Sheets

WING CUTTER ATTACHMENT

BACKGROUND OF THE INVENTION

1. Field of the Invention

This invention relates to the art of butchering, and more particularly to an apparatus for severing the wing joints of chicken wings online (i.e., without the wings first having been removed from the breasts) to produce cleanly cut wing segments.

2. Description of the prior art

There are some generally related devices in this field of endeavor. Prior U.S. Patents of interest include No. 2,243,951—Gehlke, No. 3,639,945—Duncan et al., No. 4,016,624—Martin et al., No. 4,424,608—Martin, No. 4,503,587—Martin, No. 4,536,919—Cashwell et al., No. 4,563,791—Martin Et al., No. 4,577,368—Hazenbroek, No. 4,597,136—Hazenbroek, and No. 4,769,872—Hazenbroek et al.

Some prior inventors have addressed the problem of automatically locating the wing joints, prior to cutting—see, for example, U.S. Pat. No. 4,769,872, in which a wing is positioned on a fixture that tends to locate the joints properly. Problems of adaptability to different wing sizes are apparent with this approach. There have been various other approaches, frequently resulting in complex machinery and imprecise operation. For these reasons, an improved on-line wing cutting device is still needed.

SUMMARY OF THE INVENTION

The present invention provides an improved apparatus for cutting up chicken wings while the wings are attached to the breasts. A particularly important part of the invention is directed to making the elbow joint cut, to separate the flat wing segment from the drumette. Throughout this application, we use industry terminology, referring to the three segments of the wing as the tip, the flat, and the drumette; the drumette is the meatiest portion, closest to the breast. Also, refer to the joint between the drumette and the flat as the "elbow", realizing this not to be the proper anatomical term.

A primary object of the invention is to automate chicken wing cutting. A related object is to produce parts of high and uniform quality.

A further object of the invention is to minimize the complexity of a chicken wing splitting apparatus.

These objects are attained by an apparatus for cutting breast-attached chicken wings into parts, the apparatus comprising a stationary frame, a pair of coplanar panels affixed to the frame, and having generally parallel edges facing one another, with a gap between the edges through which a wing can fit, means for moving the wing along the gap, a rotary auger conveyor positioned adjacent one of the panels, and extending substantially parallel to the gap, means for holding a flat segment of the wing in engagement with the auger conveyor, a blade positioned adjacent the gap, between the gap and the auger conveyor, for cutting the elbow joint of the wing, and means for centering the elbow joint over the blade.

BRIEF DESCRIPTION OF THE DRAWINGS

In the accompanying drawings.

DESCRIPTION OF THE PREFERRED EMBODIMENT

Figure 1:
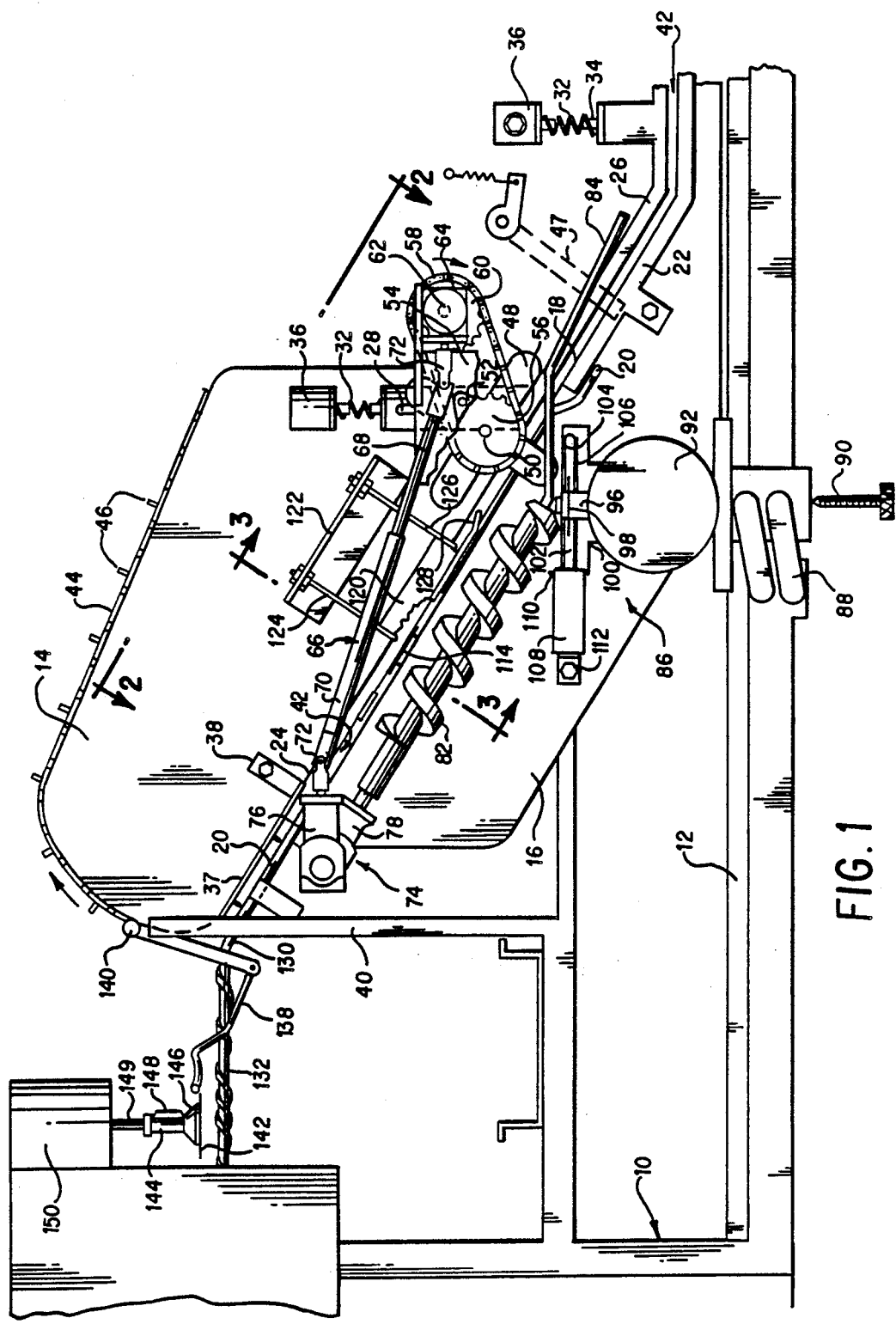
FIG. 1 is a side elevation of an apparatus embodying the invention.

The invention is embodied in an apparatus having a frame 10 constructed, preferably, from square stainless steel tubing. The frame, which is shown in simplified form in the drawings, has a lower set of rails that support a pair of spaced plastic lower chain guides 12. Chains, not shown, run along the top edges of these guides. The preferred plastic is ultra-high molecular weight polyethylene (UHMW), and this material is preferred for all components subsequently described as "plastic". Other materials may be appropriate, provided they have adequate mechanical characteristics and meet USDA requirements for poultry processing equipment.

The frame also supports a pair of upper plastic panels 14 and lower panels 16, one of each visible in FIG. 1. Each panel 14 lies vertically above, and is coplanar with, the lower panel 16. Since the apparatus is in most respects symmetrical, we have shown, and henceforth describe, structure on only one side of the machine. FIG. 1 shows the left side of the machine (left, from the perspective of one looking down the machine in the direction of product flow).

The lower panel 16 has an upper edge 18, a short segment of which is visible in FIG. 1. A round metal guide rod 20 extends along the upper edge of the panel 16, running parallel and level with the edge 18, and being attached at both ends to the panel, with provision for limited turning of the rod about its own axis, so that the angularity of a blade, described below, can be adjusted.

A flat metal guide bar 22 extends along the lower, upstream, portion of the panel 16, also following the contour of its edge, and being affixed to the panel.

The upper panel 14 has a lower edge 24, a short length of which is visible in the drawing. At the upstream end of the panel 14, a second flat guide bar 26 runs vertically above the bar 22, with a gap therebetween. The upper bar is not immovably affixed, however, but can move vertically, owing to a slot-and-pin mounting arrangement. The movable guide bar is downwardly biased by its own weight, and by a pair of compression springs 32, retained by pins 34, extending between the tabs on the bar and on brackets 36 affixed to the panel 14.

At the downstream end of the upper panel 14, a small diameter round metal guide rail 37 runs parallel and level with the lower edge 24, from a mounting bracket 38 to a mounting (not visible) affixed to the vertical frame member 40. As illustrated by arrows 42, there is a gap between the panels, extending for their full length. The purpose of this gap, as will be described more fully later, is to receive and retain the wing on a breast fillet, as the fillet is carried between the panels 14 and 16 by means of conveyor chains 44 having spaced tabs 46 for pushing the wings along the length of the gap. The chains 44 are driven by conventional means, not shown.

A spring-loaded pivoting arm 47, positioned behind panel 14 adjacent the conveyor chain, ensures that each wing is in contact with one of the tabs 46 as the wing enters the cutting mechanism.

A paddle 48 is mounted fast to a horizontal shaft 50 supported by a single bearing outboard of the paddle.

Since the bearing 52 and its support plate 54 obstruct details of the apparatus, they have been almost wholly removed in FIG. 1, so that the underlying detail can be seen. A sprocket 56 is mounted on the shaft 50, between the paddle and the support bearing. This sprocket is connected by a chain 58 to a second sprocket 60 affixed to a cross-shaft 62, which is supported on the frame 10 by means of bearings, not shown.

The portion of the cross-shaft 62 outboard of the sprocket 60 is connected to the input shaft of a right-angle transfer unit 64. The output shaft of the transfer unit is connected, by means of driveshaft 66 having telescoping first and second ends 68, 70 each provided with a universal joint 72, to a upper transfer assembly designated generally by reference numeral 74. The upper transfer assembly comprises two transfer units 76 and 78, each identical to unit 64, interconnected by a flexible connection 80 that allows for some misalignment.

The output shaft of the unit 78, which appears behind unit 76 in FIG. 1, drives a plastic auger 82 whose lower end turns on a rod 84 supported by the frame of the apparatus.

Just below the rod 84, in the view of FIG. 1, there is a wing tip cutter assembly, which is designated generally by the reference numeral 86. This entire assembly is supported on the lower frame rail by a parallelogram linkage 88. Its height can be adjusted by means of a handscrew 90; the cutter assembly is not affixed to the panel 16, but slides vertically against it.

The wing tip cutter assembly 86 comprises a motor 92, a transfer unit 94 (FIG. 2) having an output spindle 96 on which a rotary blade 98 is affixed by means of a nut, and a die assembly 100. The die assembly, which is bolted to the upper surface of the transfer unit 94, is a metal plate having an aperture 102 extending parallel to the pane of the blade 98. The aperture lies between a pair of outwardly extending flanges 104 and 106, which lie on either side of the blade 98 over a small portion of the circumference of the blade. A safety cover 108 is mounted on a hinge 110 at the downstream end of the die assembly. Movement of this cover, shown in its fully open position in FIG. 1, is limited by the stop 112, which is affixed to the panel 16.

Figure 3:
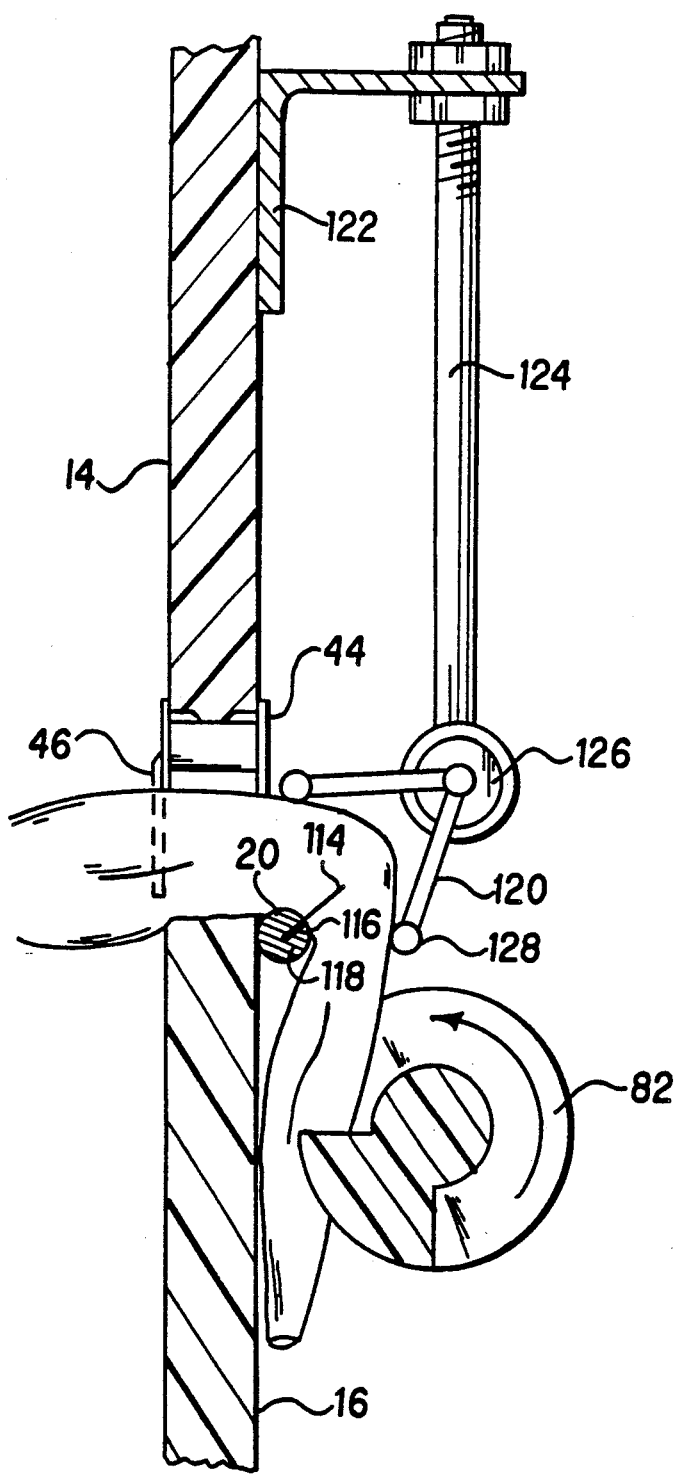
FIG. 3 is a sectional view taken along the line 3—3 in FIG. 1.

The "flat", or second segment, of a wing is removed by passing the elbow joint of the wing over a fixed blade 114 mounted in a slot 116 in the guide bar 20; the blade is retained in the slot by set screws 118. To ensure that the proper portion of the joint passes over the blade, there is a hood 120, vertically suspended from a bracket 122 by two threaded rods 124 having at their lower ends bearings 126 that allow the hood to pivot freely. Runners 128 extend along the lower edges of the hood, which has the appearance of an inverted "V" in cross section. In FIG. 1, a portion of the hood has been broken away, to reveal the blade underneath. This portion of the structure is probably better understood by referring to FIG. 3, which shows a wing (tip already removed) in phantom.

The uppermost end 130 of each rods 20 is bent to augers 132, supported in this position by a strut, whose upper end is attached to a horizontal shaft 140. During use, this mounting is kept tight, so that the rod 138 maintained a fixed position, but the mounting can be loosened so that the rod can be moved out of the way for maintenance.

Just above each pair of augers 132,134, there is a rotary blade 142, on the bottom end of a hub 144 having a lower frustoconical portion 146, and a shaft with a cam 148 thereon. The shape of the hub helps prevent the buildup of materials on its surface. The hub is attached to the bottom of a shaft 149 extending from a drive unit 150. A hopper is positioned below the augers in proper positions to receive, respectively, the wing drumettes (which are removed by the blades 142), and the breast fillets.

Fillets that fall into the hopper are funnelled onto the surface of a belt conveyor, extending laterally of the machine to a removal bin or other device. Other removal conveyors may likewise be installed to receive the other segments of the wings at their places of removal.

Figure 2:
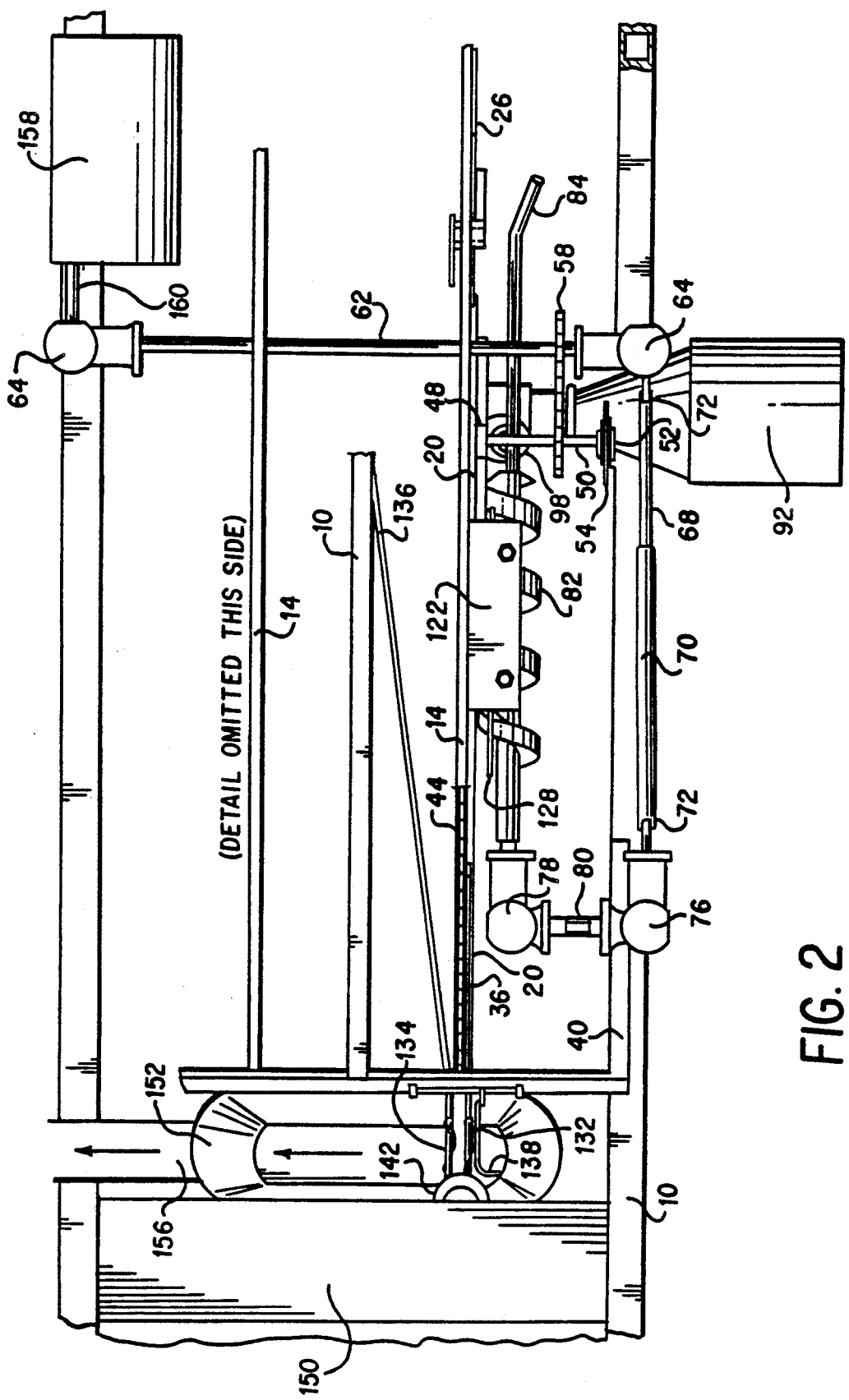
FIG. 2 is an oblique top view thereof, taken along the line 2—2 in FIG. 1.

The wing cutting apparatus described above is intended to be mounted on a breast deboning machine, which has its own drive motor. It is therefore preferred that the power for driving the augers and paddles be taken from the existing device. FIG. 2 shows diagrammatically a power take-off unit 158, connected by means of drive shaft 160 to one of the transfer units 64. Since the two units 64 are interconnected by the cross-shaft, elements on both side of the machine are driven from the PTO 158.

In operation, the conveyor chains are driven by their drive mechanism, the augers and paddles are rotated continuously by power from the PTO, and the rotary blades are rotated independently by their respective spindles. The chains carry a series of whole breast fillets, with the wings still attached, to the wing splitter apparatus, from a prior location, (off the page, to the right, in FIG. 1), where the whole breast fillet has just been removed from the ribcage. The wings have already been inserted into the gap manually, or automatically, in the upstream apparatus.

As the fillet enters the gap between the flat bars, the upper bar yields upwardly, but maintains pressure on the wing to prevent it from withdrawing back into the space between the panels 16 since the wings are the only support for the fillet. As each wing continues, it passes from the lower bar, and onto the rod 20. The breasts are between the panels 16, the drumettes extend through the gaps on either side, and the flat wing segments are draped over the rods 20.

Next, the wings are pushed and accelerated by one of the paddles, over the rotating blade, which cuts the tip off the wing at the first wing joint. The flat segment of the wing, having been captured between the rod 84 and the panel 16, becomes trapped in a space between flights of the auger and the panel 16. The flat segment is thus carried along the rod by the auger, whose conveying speed matches that of the chains.

As the wing progresses, it goes under the hood, which although freely suspended, tends to center the elbow joint over the rod (FIG. 3), so that as the wing passes over the blade, it is cut precisely at the joint, and the "flat" wing segment falls away for collection.

Now, with only the drumettes remaining attached to the fillet, each drumette enters between the counter-rotating augers 132,134, which raise the drumette vertically, so that it is cut off at the shoulder joint as it passes the rotating blades. The augers tend to pull meat on the drumette toward the breast, so as to maximize the breast weight, as described in a copending application. The whole breast fillet, no longer supported, falls onto a conveyor along with the drumettes.

During this operation, the entire wing has been cut up, and removed from the bird automatically, thus avoiding the tedium of a previously labor-intensive process. We prefer that adjustment devices for the various parts of the apparatus be liberally supplied, to enable the machine to be set up optimally for birds of various sizes; we have not described most of these devices, since their design is well within the skill of the artisan.

Inasmuch as other modifications and variations of the invention will occur to those of skill in their field, the foregoing description and the drawings should be interpreted as merely illustrative of the invention, which is defined by the following claims.

I claim:

1. An apparatus for cutting breast-attached chicken wings into parts, comprising
    a stationary frame,
    a pair of panels affixed to the frame, said panels being coplanar, and having generally parallel edges facing one another, with a gap between the edges through which a wing can fit,
    means for moving the wing along said gap,
    a rotary auger conveyor positioned adjacent one of said panels, and extending substantially parallel to said gap,
    means for holding a flat segment of the wing in engagement with said auger conveyor, and
    a blade positioned adjacent said gap, between said gap and said auger conveyor, for cutting the elbow joint of the wing, and means for centering the elbow joint over said blade.

2. The invention of claim 1, wherein the means for moving the wing comprises a conveyor chain having spaced tabs extending into the gap.

3. The invention of claim 1, wherein the means for centering the elbow joint comprises a hood suspended from the frame over said blade.

* * * * *